United States Patent
Martin et al.

(10) Patent No.: US 12,554,704 B2
(45) Date of Patent: Feb. 17, 2026

(54) STALE DATA RECOGNITION

(71) Applicant: International Business Machines Corporation, Armonk, NY (US)

(72) Inventors: Daniel Martin, Leinfelden-Echterdingen (DE); Jia Heng Zhong, San Jose, CA (US); Sowmya Kameswaran, San Jose, CA (US); Manogari Nogi Simanjuntak, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 8 days.

(21) Appl. No.: 17/476,039

(22) Filed: Sep. 15, 2021

(65) Prior Publication Data

US 2023/0086203 A1    Mar. 23, 2023

(51) Int. Cl.
  *G06F 16/23* (2019.01)
  *G06F 16/22* (2019.01)
  *G06F 16/2455* (2019.01)
  *G06F 16/25* (2019.01)
  *G06F 16/27* (2019.01)

(52) U.S. Cl.
  CPC ...... *G06F 16/2379* (2019.01); *G06F 16/2282* (2019.01); *G06F 16/2455* (2019.01); *G06F 16/254* (2019.01); *G06F 16/27* (2019.01)

(58) Field of Classification Search
  CPC .. G06F 16/2379; G06F 16/27; G06F 16/2282; G06F 16/2455; G06F 16/254
  USPC ........................................................ 707/602
  See application file for complete search history.

(56) References Cited

U.S. PATENT DOCUMENTS

| 2,017,035 A | * | 10/1935 | Avery | ..................... B60T 11/22 92/99 |
| 5,438,575 A |   | 8/1995  | Bertrand | |
| 6,704,933 B1 | * | 3/2004 | Tanaka | ................... H04N 7/163 725/132 |

(Continued)

OTHER PUBLICATIONS

Mell, Peter and Tim Grance, "The NIST Definition of Cloud Computing," National Institute of Standards and Technology, Information Technology Laboratory, Special Publication 800-145, Sep. 2011, pp. 1-7.

*Primary Examiner* — Md I Uddin
*Assistant Examiner* — Jessica N Le
(74) *Attorney, Agent, or Firm* — Lily Neff, Esq.; Rachel L. Pearlman, Esq.; Heslin Rothenberg Farley & Mesiti P.C.

(57) ABSTRACT

A method, computer program product, and system include a processor(s) obtaining a query request from an application via a source database management system to a target database management system, where the query request comprises a query and a query timestamp indicating a last update to table(s) in the source database management system referenced in the query request. The processor(s) determines a table update timestamp indicating a last time when the table(s) in the source database management system referenced in the query request was replicated to the target database management system. The processor(s) generates an indicator where the indicator represent a difference between the query timestamp and the table update timestamp. The processor(s) executes the query in the target database management system. The processor(s) transmit a query result and the indicator to the source database management system.

20 Claims, 6 Drawing Sheets

(56) References Cited

U.S. PATENT DOCUMENTS

| | | | |
|---|---|---|---|
| 7,519,736 B2 | 4/2009 | Parham | |
| 7,565,261 B2 | 7/2009 | Hochmuth | |
| 7,606,791 B2 * | 10/2009 | Dettinger | G06F 16/2477 |
| | | | 707/999.102 |
| 7,788,223 B2 | 8/2010 | Liu et al. | |
| 7,941,560 B1 * | 5/2011 | Friesen | G06F 16/957 |
| | | | 709/224 |
| 8,260,966 B2 | 9/2012 | Shatsky et al. | |
| 8,719,432 B1 | 5/2014 | Vermeulen et al. | |
| 9,171,019 B1 * | 10/2015 | Donlan | G06F 16/2343 |
| 9,632,828 B1 | 4/2017 | Mehta et al. | |
| 9,659,039 B2 | 5/2017 | Ziauddin et al. | |
| 10,037,346 B1 * | 7/2018 | Hsieh | G06F 16/27 |
| 10,275,507 B2 | 4/2019 | Hrle et al. | |
| 10,318,521 B2 * | 6/2019 | Horii | G06F 11/3006 |
| 10,657,123 B2 * | 5/2020 | Banister | G06F 16/2477 |
| 10,909,098 B2 | 2/2021 | McLean et al. | |
| 11,093,477 B1 * | 8/2021 | Martin | G06F 16/2322 |
| 11,144,574 B2 * | 10/2021 | Boh | G06F 16/273 |
| 11,250,019 B1 * | 2/2022 | Goyal | G06F 16/24568 |
| 11,269,784 B1 * | 3/2022 | Siemssen | G06F 16/172 |
| 11,354,310 B2 * | 6/2022 | Ziauddin | G06F 16/22 |
| 11,640,400 B2 * | 5/2023 | Gladwin | G06F 16/24545 |
| | | | 707/719 |
| 2004/0236746 A1 * | 11/2004 | Lomet | G06F 16/2477 |
| | | | 707/999.009 |
| 2006/0069672 A1 * | 3/2006 | Maloney | G06F 16/2272 |
| 2007/0271242 A1 * | 11/2007 | Lindblad | G06F 16/24526 |
| | | | 707/E17.127 |
| 2007/0288524 A1 * | 12/2007 | Luick | H04L 67/1095 |
| 2009/0157623 A1 * | 6/2009 | Bedi | G06F 16/24561 |
| 2009/0216709 A1 * | 8/2009 | Cheng | G06F 16/2453 |
| 2010/0205232 A1 * | 8/2010 | Moriwake | G06F 3/0625 |
| | | | 711/E12.001 |
| 2010/0205323 A1 * | 8/2010 | Barsness | G06F 16/2471 |
| | | | 709/248 |
| 2010/0274759 A1 * | 10/2010 | Takeuchi | G06F 16/275 |
| | | | 707/624 |
| 2011/0302195 A1 * | 12/2011 | Cai | G06F 16/83 |
| | | | 707/769 |
| 2012/0150791 A1 * | 6/2012 | Willson | G06F 16/254 |
| | | | 707/600 |
| 2012/0290595 A1 * | 11/2012 | Kreindler | G06F 16/2372 |
| | | | 707/756 |
| 2013/0185201 A1 * | 7/2013 | Jain | G07F 7/0846 |
| | | | 705/41 |
| 2014/0012808 A1 * | 1/2014 | Lindsay | G06F 9/5061 |
| | | | 707/609 |
| 2014/0279881 A1 * | 9/2014 | Tan | G06F 16/275 |
| | | | 707/613 |
| 2014/0310623 A1 * | 10/2014 | O'Connell, Jr. | G06F 16/958 |
| | | | 715/764 |
| 2015/0046665 A1 * | 2/2015 | Higgins | G06F 12/023 |
| | | | 711/158 |
| 2016/0110439 A1 * | 4/2016 | Hrle | G06F 16/2358 |
| | | | 707/600 |
| 2016/0139912 A1 * | 5/2016 | Kawai | G06F 8/656 |
| | | | 717/170 |
| 2016/0196532 A1 | 7/2016 | De et al. | |
| 2016/0203050 A1 * | 7/2016 | Hrle | G06F 11/1402 |
| | | | 707/625 |
| 2016/0217169 A1 * | 7/2016 | Elias | G06F 21/6227 |
| 2016/0275150 A1 * | 9/2016 | Bournonnais | G06F 16/25 |
| 2016/0299932 A1 * | 10/2016 | Pound | G06F 16/2379 |
| 2017/0039251 A1 * | 2/2017 | Legrand | G06F 16/24578 |
| 2017/0046384 A1 * | 2/2017 | Di Blas | G06F 16/24534 |
| 2017/0344593 A1 * | 11/2017 | Mullick | G06F 16/1873 |
| 2018/0046643 A1 * | 2/2018 | Brodt | G06F 16/178 |
| 2018/0129687 A1 * | 5/2018 | Bester | G06F 16/215 |
| 2018/0253463 A1 * | 9/2018 | Bastawala | G06F 15/76 |
| 2018/0336199 A1 * | 11/2018 | Ignatyev | G06F 16/2456 |
| 2019/0121887 A1 * | 4/2019 | Beier | G06F 16/2291 |
| 2019/0155937 A1 * | 5/2019 | Barve | G06F 16/27 |
| 2019/0294614 A1 | 9/2019 | Brodt et al. | |
| 2019/0297588 A1 * | 9/2019 | Roy | H04W 56/001 |
| 2019/0347342 A1 * | 11/2019 | Kameswaran | G06F 11/3476 |
| 2020/0151195 A1 | 5/2020 | Brodt et al. | |
| 2020/0409917 A1 * | 12/2020 | McLean | G06F 9/451 |
| 2021/0081434 A1 * | 3/2021 | Dombroski | G06F 16/282 |
| 2021/0089529 A1 * | 3/2021 | Koppuravuri | G06F 16/24542 |
| 2021/0142118 A1 * | 5/2021 | Lugt | G06F 18/24765 |
| 2021/0286609 A1 * | 9/2021 | Killian | H04L 51/04 |
| 2021/0303597 A1 * | 9/2021 | Zhang | G06F 16/275 |
| 2021/0319031 A1 * | 10/2021 | Edara | G06F 16/248 |
| 2022/0100759 A1 * | 3/2022 | van der Schyff | G06F 16/24539 |
| 2022/0179868 A1 * | 6/2022 | Mortazavi | G06F 16/2379 |
| 2023/0325404 A1 * | 10/2023 | Dimov | H04L 67/1095 |
| | | | 707/617 |
| 2023/0376297 A1 * | 11/2023 | Ji | G06F 8/65 |

* cited by examiner

STALE DATA RECOGNITION

BACKGROUND

Data coherency issues are common because many applications rely on accessing the most recent data both for online analytical processing (OLAP) and for online transactional processing (OLTP). OLAP involves performing multidimensional analysis at high speeds on large volumes of data from a data warehouse, data mart, or some other unified, centralized data store. OLTP consists of executing a number of transactions occurring concurrently. Traditional database management systems (DBMS) cannot individually support this dual access requirement because they specialize in handling either operational or analytical workloads. Thus, the technical architecture of these systems includes at least two DBMSs to meet the needs of these applications. This duplication can create issues with data, including that different DBMSs operate on their own copies of data and thus, keeping these copies coherent creates a challenge. Issues with data coherency can be magnified because enterprises manage a rapidly increasing volume of information (e.g., for optimizing production and distribution processes, for evaluating compliance and customer satisfaction, and/or for managing staff-related data). Due to the volume of data, many different systems can be used for managing data, and the data is distributed over many different distributed sources.

SUMMARY

Shortcomings of the prior art are overcome, and additional advantages are provided through the provision of a method for determining the temporal condition of data upon which a query was executed. The method includes, for instance: obtaining, by one or more processors, a query request from an application via a source database management system to a target database management system, where the query request comprises a query and a query timestamp indicating a last update to one or more tables in the source database management system referenced in the query request. The method includes determining, by the one or more processors, a table update timestamp indicating a last time when the one or more tables in the source database management system referenced in the query request was replicated to the target database management system. The method includes generating, by the one or more processors, an indicator wherein the indicator represents a difference between the query timestamp and the table update timestamp. The method includes executing, by the one or more processors, the query in the target database management system. The method includes based on executing the query, obtaining, by the one or more processors, a query result. The method includes transmitting, by the one or more processors, the query result and the indicator to the source database management system.

In some examples of the method, the source database management system is an online transactional processing system.

In some examples of the method, the target database management system is an online analytical processing system.

In some examples of the method, determining the table update timestamp comprises: querying, by the one or more processors, a replication engine communicatively coupled to a capture engine of the source database management system and the target database management system to obtain the table update timestamp.

In some examples of the method, executing the query comprises executing the query by an accelerator.

In some examples of the method, the one or more tables in the source database management system referenced in the query request were loaded into the accelerator column store structure.

In some examples of the method, the query comprises a reference to one or more tables in another source database management system, the method further comprises: querying, by the one or more processors, the other source database management system to obtain another query timestamp indicating a last update to the one or more tables in the other source database management system. The method includes determining, by the one or more processors, a table update timestamp indicating a last time when the one or more tables in the other source database management system were replicated to the target database management system. The method includes generating, by the one or more processors, another indicator wherein the other indicator represents a difference between the other query timestamp and the table update timestamp indicating the last time when the one or more tables in the other source database management system was replicated to the target database management system. The method includes transmitting, by the one or more processors, the other indicator with the query result and the indicator to the source database management system.

In some examples of the method, the method includes displaying, by the one or more processors, the indicator in an interface communicatively coupled to the source database management system.

In some examples of the method, the method includes determining, by the one or more processors, that data queried when executing the query is current based on the difference indicating that the query timestamp is and same or older than the table update timestamp.

In some examples of the method, the method includes determining, by the one or more processors, that data queried when executing the query is stale based on the difference indicating that the query timestamp is and newer than the table update timestamp.

Shortcomings of the prior art are overcome, and additional advantages are provided through the provision of a computer program product for determining the temporal condition of data upon which a query was executed. The computer program product comprises a storage medium readable by a one or more processors and storing instructions for execution by the one or more processors for performing a method. The method includes, for instance: obtaining, by the one or more processors, a query request from an application via a source database management system to a target database management system, where the query request comprises a query and a query timestamp indicating a last update to one or more tables in the source database management system referenced in the query request. The method includes determining, by the one or more processors, a table update timestamp indicating a last time when the one or more tables in the source database management system referenced in the query request was replicated to the target database management system. The method includes generating, by the one or more processors, an indicator wherein the indicator represents a difference between the query timestamp and the table update timestamp. The method includes executing, by the one or more processors, the query in the target database management system. The method includes based on executing the query, obtaining, by the one or more processors, a query result. The method includes transmitting, by the one or more processors, the query result and the indicator to the source database management system.

In some examples of the computer program product, the source database management system is an online transactional processing system.

In some examples of the computer program product, the target database management system is an online analytical processing system.

In some examples of the computer program product, determining the table update timestamp comprises: querying, by the one or more processors, a replication engine communicatively coupled to a capture engine of the source database management system and the target database management system to obtain the table update timestamp.

In some examples of the computer program product, executing the query comprises executing the query by an accelerator.

In some examples of the computer program product, the one or more tables in the source database management system referenced in the query request were loaded into the accelerator column store structure.

In some examples of the computer program product, the query comprises a reference to one or more tables in another source database management system, the method further comprises: querying, by the one or more processors, the other source database management system to obtain another query timestamp indicating a last update to the one or more tables in the other source database management system. The method includes determining, by the one or more processors, a table update timestamp indicating a last time when the one or more tables in the other source database management system were replicated to the target database management system. The method includes generating, by the one or more processors, another indicator wherein the other indicator represents a difference between the other query timestamp and the table update timestamp indicating the last time when the one or more tables in the other source database management system was replicated to the target database management system. The method includes transmitting, by the one or more processors, the other indicator with the query result and the indicator to the source database management system.

In some examples, the computer program product includes displaying, by the one or more processors, the indicator in an interface communicatively coupled to the source database management system.

In some examples, the computer program product includes determining, by the one or more processors, that data queried when executing the query is current based on the difference indicating that the query timestamp is and same or older than the table update timestamp.

In some examples, the computer program product includes determining, by the one or more processors, that data queried when executing the query is stale based on the difference indicating that the query timestamp is and newer than the table update timestamp.

Shortcomings of the prior art are overcome, and additional advantages are provided through the provision of a system for determining the temporal condition of data upon which a query was executed. The system includes a memory, one or more processors in communication with the memory, and program instructions executable by the one or more processors via the memory to perform a method. The method includes, for instance: obtaining, by the one or more processors, a query request from an application via a source database management system to a target database management system, where the query request comprises a query and a query timestamp indicating a last update to one or more tables in the source database management system referenced in the query request. The method includes determining, by the one or more processors, a table update timestamp indicating a last time when the one or more tables in the source database management system referenced in the query request was replicated to the target database management system. The method includes generating, by the one or more processors, an indicator wherein the indicator represents a difference between the query timestamp and the table update timestamp. The method includes executing, by the one or more processors, the query in the target database management system. The method includes based on executing the query, obtaining, by the one or more processors, a query result. The method includes transmitting, by the one or more processors, the query result and the indicator to the source database management system.

In some examples of the system, the source database management system is an online transactional processing system.

In some examples of the system, the target database management system is an online analytical processing system.

In some examples of the system, determining the table update timestamp comprises: querying, by the one or more processors, a replication engine communicatively coupled to a capture engine of the source database management system and the target database management system to obtain the table update timestamp.

In some examples of the system, executing the query comprises executing the query by an accelerator.

In some examples of the system, the one or more tables in the source database management system referenced in the query request were loaded into the accelerator column store structure.

In some examples of the system, the query comprises a reference to one or more tables in another source database management system, the method further comprises: querying, by the one or more processors, the other source database management system to obtain another query timestamp indicating a last update to the one or more tables in the other source database management system. The method includes determining, by the one or more processors, a table update timestamp indicating a last time when the one or more tables in the other source database management system were replicated to the target database management system. The method includes generating, by the one or more processors, another indicator wherein the other indicator represents a difference between the other query timestamp and the table update timestamp indicating the last time when the one or more tables in the other source database management system was replicated to the target database management system. The method includes transmitting, by the one or more processors, the other indicator with the query result and the indicator to the source database management system.

In some examples, the system includes displaying, by the one or more processors, the indicator in an interface communicatively coupled to the source database management system.

In some examples, the system includes determining, by the one or more processors, that data queried when executing the query is current based on the difference indicating that the query timestamp is and same or older than the table update timestamp.

In some examples, the system includes determining, by the one or more processors, that data queried when executing the query is stale based on the difference indicating that the query timestamp is and newer than the table update timestamp.

Methods, computer program products, and systems relating to one or more aspects are also described and claimed herein. Further, services relating to one or more aspects are also described and may be claimed herein.

Additional features are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

Figure 1:
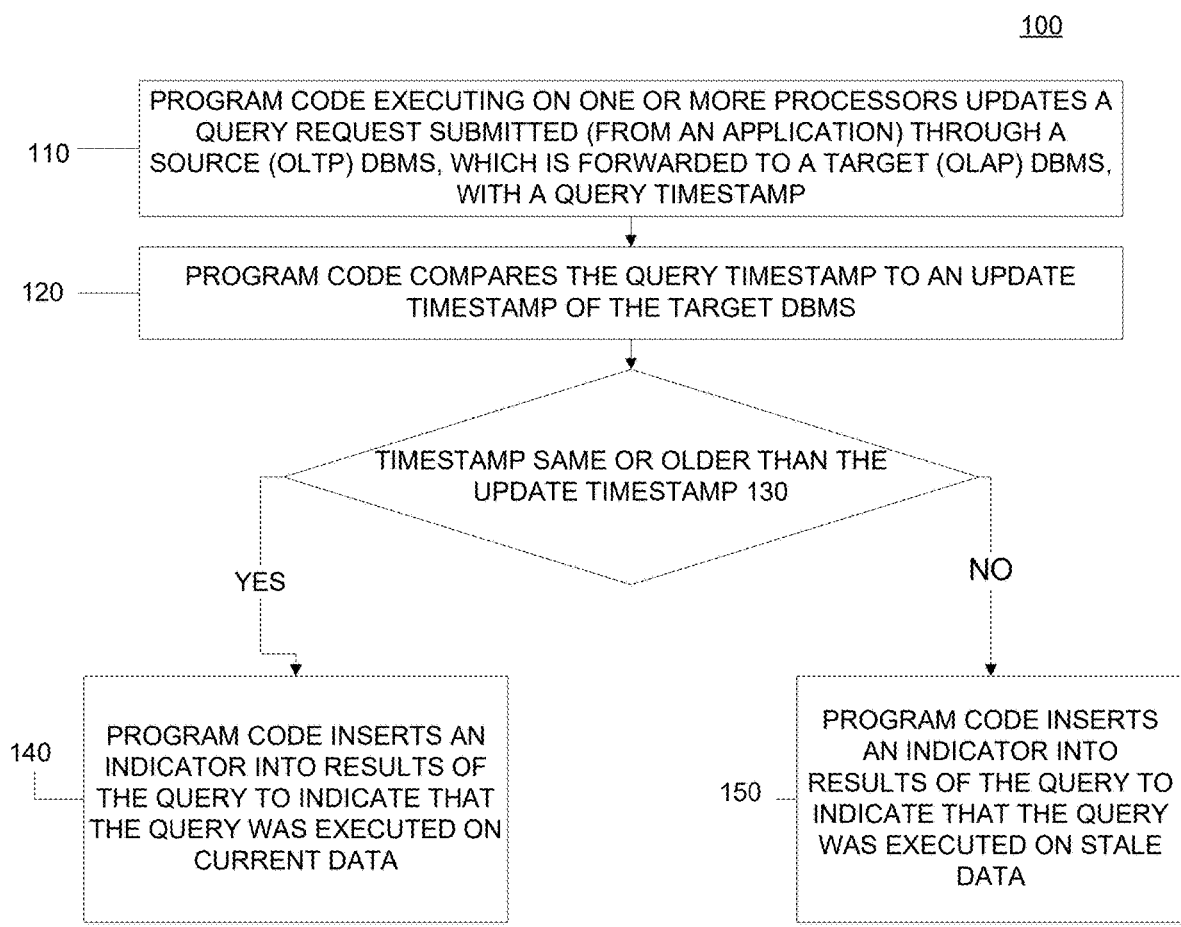
FIG. 1 depicts a workflow that includes various aspects of some embodiments of the present invention.

The accompanying figures, in which like reference numerals refer to identical or functionally similar elements throughout the separate views and which are incorporated in and form a part of the specification, further illustrate the present invention and, together with the detailed description of the invention, serve to explain the principles of the present invention. As understood by one of skill in the art, the accompanying figures are provided for ease of understanding and illustrate aspects of certain embodiments of the present invention. The invention is not limited to the embodiments depicted in the figures.

Figure 4:
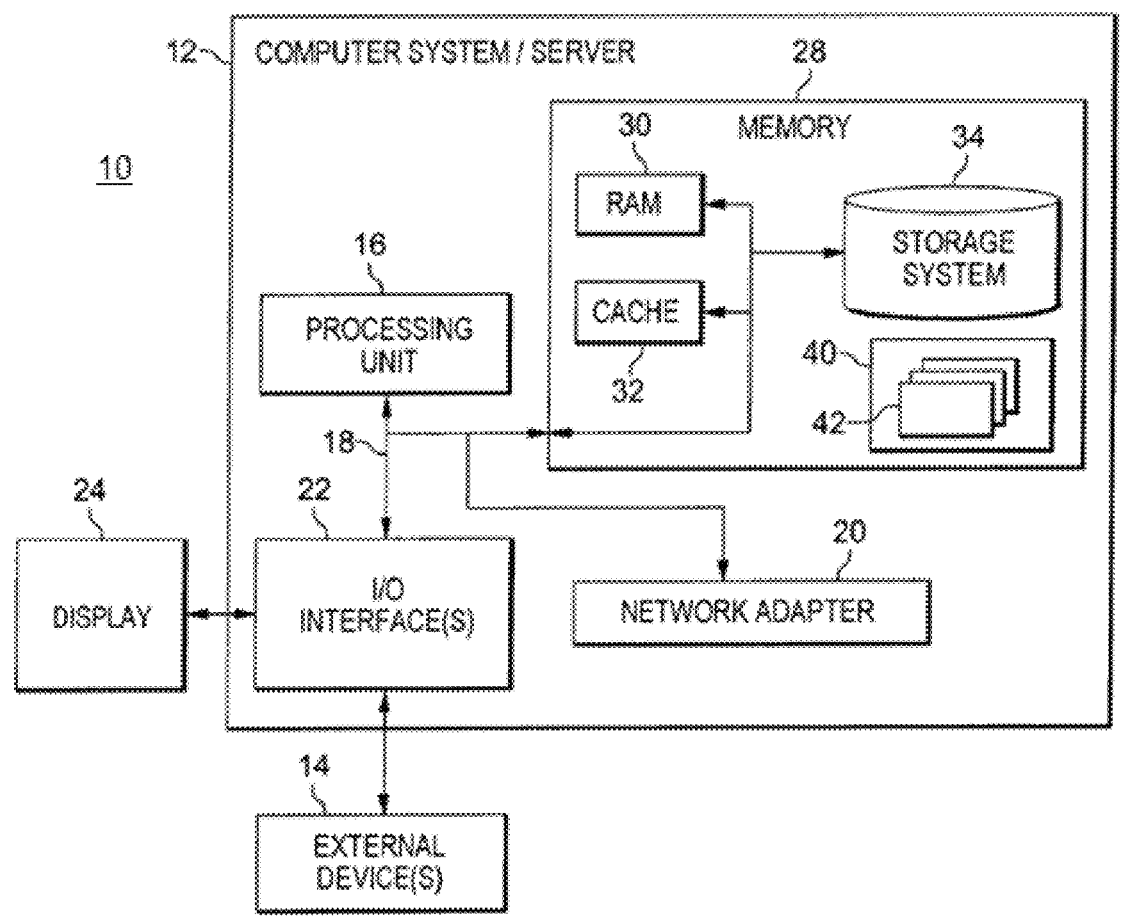
FIG. 4 depicts on embodiment of a computing node that can be utilized in a cloud computing environment.

As understood by one of skill in the art, program code, as referred to throughout this application, includes both software and hardware. For example, program code in certain embodiments of the present invention includes fixed-function hardware, while other embodiments utilized a software-based implementation of the functionality described. Certain embodiments combine both types of program code. One example of program code, also referred to as one or more programs, is depicted in FIG. 4 as program/utility 40, having a set (at least one) of program modules 42, may be stored in memory 28.

Embodiments of the present invention provide a computer-implemented method, a computer program product, and a system where program code executing on one or more processors detects and/or reports data staleness in asynchronous replication enabled hybrid database management systems. The program code detects and reports query result data staleness in a hybrid data management system that is asynchronously replicated such that this information can be utilized to ensure that users are aware on how current their query results are and can adjust processes to make sure that the results are fresh within expectations. As will be discussed in greater detail herein, in embodiments of the present invention, to detect and/or report data staleness in an asynchronous replication enabled hybrid database management system, program code executing on one or more processors will utilize an indicator to demonstrate whether a given process (e.g., a business process executed by an application) utilized stale or current data. Modern applications can require access to most recent data for both OLAP and OLTP operations and therefore utilize two DBMSs, one to handle each type of processing. An accelerator can combine the abilities of the OLTP system and the OLAP systems, where data is asynchronously replicated to the accelerator (OLAP system) from OLTP system. However, the data replication can create situations where certain data are stale. For example, when an accelerator is utilized, one or more business processes can run when data replication to the accelerator (OLAP system) is still underway and not completed. This results in the business process executing on stale data instead of current data. There could be some applications which are expecting to run on current data and are unaware of the replication process still being underway. To that end, the program code generates and reports this indicator when returning query results. In some examples, when the program code submits a query (querying target tables) through a source DBMS (e.g., an OLTP DBMS), which is forwarded to a target DBMS (e.g., an OLAP DBMS), the program code includes in this query, a timestamp which indicates when the target tables were last updated on the source DBMS. The program code compares the query timestamp to an update timestamp of the target DBMS (e.g., the OLAP DBMS). If the program code determines that the query timestamp is the same or older than the update timestamp of the target DBMS (e.g., the OLAP DBMS), the resulting data returned from the query is current. The program code reflects this (staleness) result as an indicator, which it includes in the resulting data. In many technical environments, data replication between multi-system databases is standard and regardless of the type of replication utilized, embodiments of the present invention enable the inclusion of an indicator in a query result itself to indicate staleness of data included in the result, and thus, the indicator reports the staleness of the data in target tables of the query.

Embodiments of the present invention provide significant advantages over existing approaches for determining whether data utilized for database queries is stale at least because in embodiments of the present invention, the program code utilizes indicators in query results themselves to express the staleness of data utilized to produce these results. Current approaches to comprehending the staleness of data utilized in various processes involve both manual intervention and specific knowledge of processes being executed by various applications. For example, provided users are familiar with operations within a given application, the users can control whether queries operate on current (updated) data by waiting for updates to the data to occur. In current approaches, to determine whether data is consistent across OTLP and OLAP systems, as both are utilized by modern applications, leading to coherency issues, users can implement mechanisms to periodically compare results from OLAP and OLTP systems by performing comparisons, including checking row counts and checking update timestamps between the systems. These approaches are all pre-emptive and can be labor intensive. Rather than waiting or performing pre-emptive data checks, embodiments of the present invention enable a user to obtain results which themselves indicate whether the data utilized is current. Thus, depending on the type of query, the user can determine whether the results can be utilized (as in some cases, current data is needed and in others, this is not essential).

Utilizing a staleness indicator in query results also represents an advantage over existing methods of expressing data staleness. As aforementioned, to determine whether two DBMSs are in sync, in accordance with existing methods, various aspects of the databases can be compared. The understanding gained from these processes is very general as it is just a latency measure of the replication process between database resources in the environment. Meanwhile, indicating the staleness of data utilized to produce a query result in the query result itself is a granular indicator of data coherence. The indicator returned by the program code in embodiments of the present invention is specific to the target tables accessed by the query for which the result is being returned. As understood by one of skill in the art, staleness can vary between applications, some tables may be updated more frequent than others, and some updates may have a shorter unit of work than others. Thus, whether data returned by a given query is stale can be indicated more accurately based on the target tables for the query rather than various general measures of the target database as a whole. The staleness indicators utilized in embodiments of the present invention indicate measurable staleness values which enable users, including developers and administrators, and applications themselves to determine whether the results in which the indicators were included are acceptable or not. Different applications may have different tolerances (e.g., credit card fraud analytics may require the staleness value to be very small). Thus, the users and applications can determine, based on the measurable value provided, whether to utilize the results.

Embodiments of the present invention are inextricably linked to computing and are directed to a practical application. Taking the second item first, including a staleness indicator in a query result provides a granular view of which data are stale and assists both administrators and application developers in understanding if their applications are running with current data or not and how long the applications should wait to use current data. Understanding the replication timing on this granular (e.g., target table) level can reduce application latency as well as increase the accuracy of the queries. Embodiments of the present invention are inextricably linked to computing at least because they are directed to resolving an issue that is unique to computing, i.e., detecting and/or reporting data staleness in asynchronous replication enabled hybrid database management systems. Certain applications utilize more than one type of DBMS, requiring data replication, and also, results produced by these applications are only useful if the data accessed to provide the results are current. Both this issue and the solution, generating an indicator for inclusion in query results, are inextricably tied to computing.

FIG. 1 is a workflow 100 that provide a general overview of various aspects of some embodiments of the present invention. As illustrated in FIG. 1, in examples herein, program code executing on one or more processors calculates and reports an indicator that specifies if a query (e.g., included in or comprising a business process or application) ran on current or stale data. In FIG. 1, program code executing on one or more processors updates a query request submitted (from an application) through a source (OLTP) DBMS, which is forwarded to a target (OLAP) DBMS, with a query timestamp (110). The query timestamp indicates when target tables of the query were last updated on the source DBMS. The program code compares the query timestamp to an update timestamp of the target DBMS (120). The update timestamp indicates the last time the target DBMS was updated. The program code determines if the query timestamp is the same or older than the update timestamp (130). Based on determining that the query timestamp is the same or older than the update timestamp, the program code inserts an indicator into results of the query to indicate that the query was executed on current data (140). Based on determining that the query timestamp is not the same or older than the update timestamp, the program code inserts an indicator into results of the query to indicate that the query was executed on stale data (150). The program code returns the results with the indicator (160).

Figure 2:
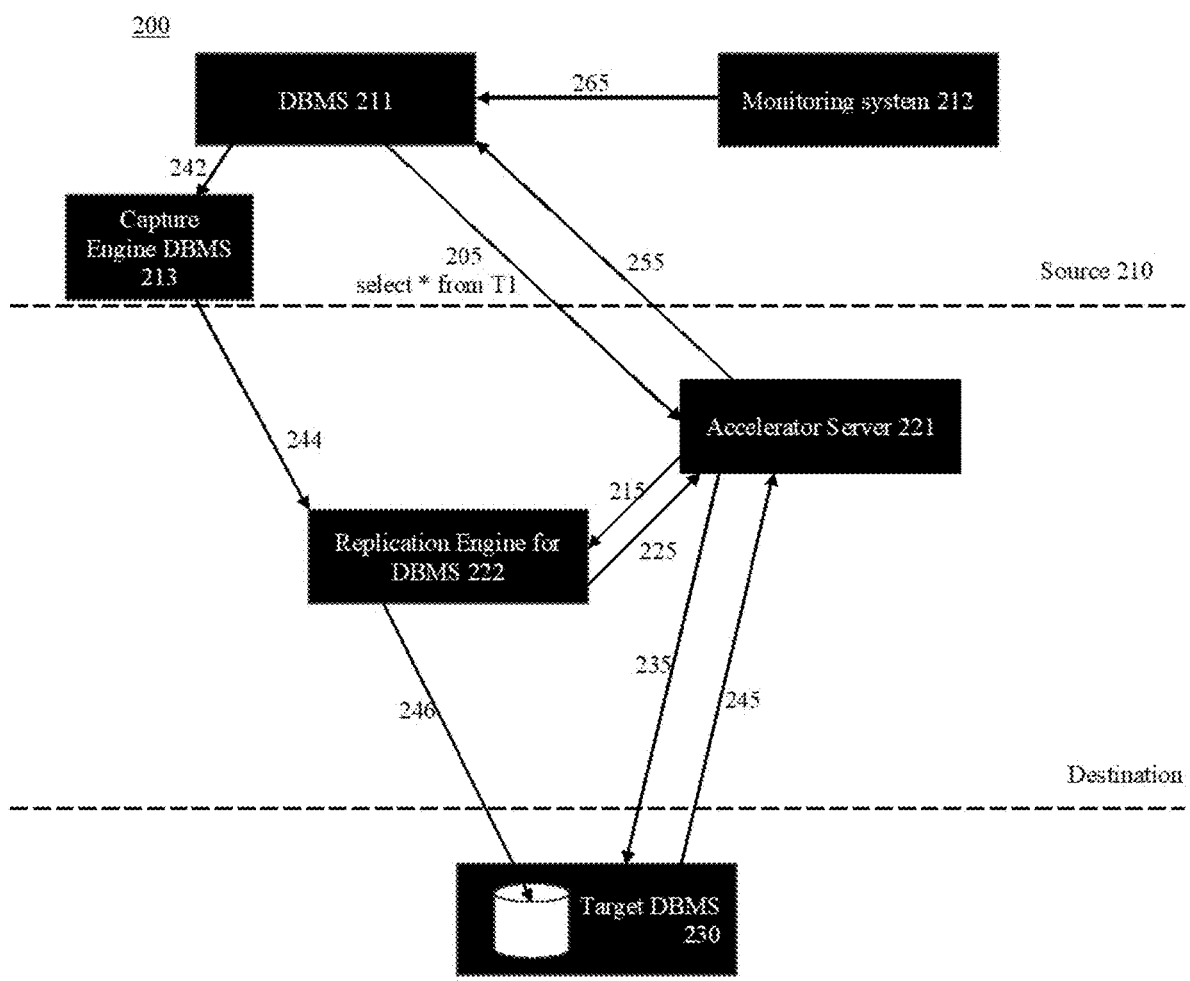
FIG. 2 depicts a technical environment in which a workflow has been implemented.
Figure 3:
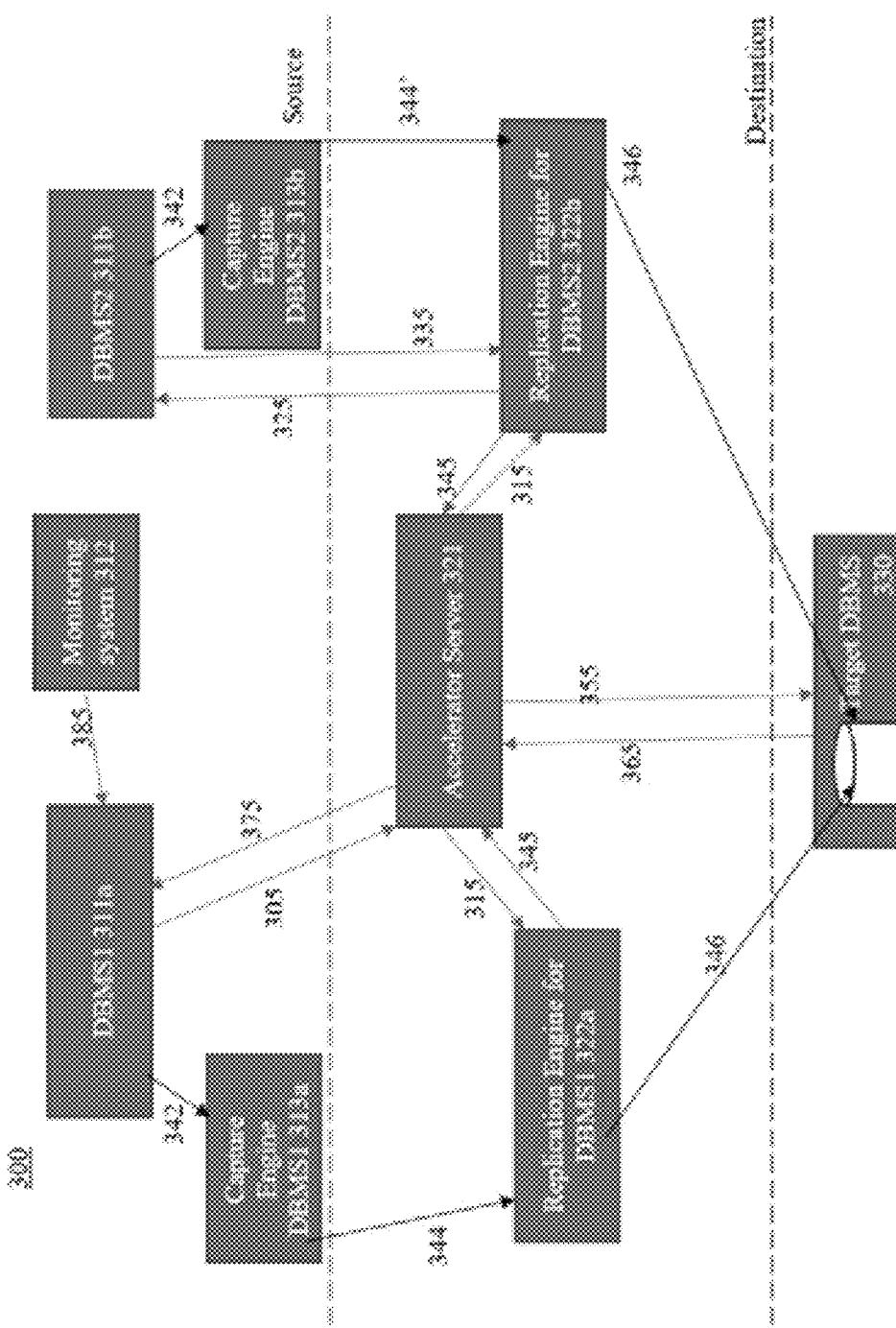
FIG. 3 depicts a technical environment in which a workflow has been implemented.

Examples of embodiments of the present invention can be implemented both when a query executes in a target DBMS from a single source DBMS and when a query executes in a target DBMS with references to data from multiple source DBMSs. FIG. 2 illustrates the single source scenario while FIG. 3 illustrates the multiple source scenario. The technical environments 200, 300 of each figures are described and then, the implementation of various aspects of embodiments of the present invention in these technical environments 200, 300 is reviewed.

Turning to FIG. 2, the technical environment 200 illustrated includes elements of a source DBMS system 210, which includes the source DBMS 211, a monitoring system 212, which monitors the source DBMS 211, and a capture engine 213 for the source DBMS. The monitoring system 212 performs tasks associated with examining the operational status of the database, by collecting information from DBMS 211, its databases, and any connected applications. For example, the monitoring system 212 can forecast hardware requirements based on database usage patterns, analyze the performance of individual applications or SQL queries, track the usage of indexes and tables, pinpoint the cause of poor system performance, and/or assess the impact of optimization activities. The capture engine 213 for the source DBMS is part of replication between the different DBMSs 211, 230 in the technical environment 200. A capture engine captures changes to databases as they happen and delivers them to target databases. In this case, the capture engine 213 for the source DBMS system 210 captures and delivers changes to the one or more databases of source DBMS 211.

Source DBMS 211 is communicatively coupled to an accelerator executing on an accelerator server 221, in the example illustrated in FIG. 2. The accelerator asynchronously replicates to the accelerator (OLAP system) from OLTP system. The replication engine 222 for the source DBMS system 210 is communicatively coupled to the capture engine 213 for the source DBMS system 210 and to the target DBMS 230 and receives accelerated queries from the accelerator server 221. Data replication occurs in this technical environment 200 when a change to a database managed by the source DBMS 211 is communicated to the capture engine 213 (242), which communicates the change to the replication engine 222 for the source DBMS system 210 (244), which replicates the change in a database managed by the target DBMS 230 (246). Thus, as illustrated in FIG. 2, the data replication process is orchestrated by the (data) capture engine 213 and the replication engine 222.

As illustrated in FIG. 2, the source DBMS 211 receives a query from an application and passes control of the query, including the query request and a timestamp indicating a latest modification for tables in the query to an accelerator (205). In this example, the query (Q1) is a select statement, "select * from T1." This query is used as an example and not to suggest any limitations. T1 is a table in the source DBMS 211 that has been loaded into the accelerator executing on the accelerator server 221 column store structure to enable acceleration for queries against table T1. Thus, the source DBMS 211 passes control of the query to the accelerator including: 1) the query request; and 2) the latest modification timestamp for tables in the query. The query Q1 can be represented by "Select * from T1 (TS1-$TS_{target1}$)" where TS1 is log position or timestamp in source DBMS 211 at time when Q1 is received.

Returning to FIG. 2, the accelerator sends the table information from the query to a replication engine 222 (215). Thus, before the accelerator executes the query (Q1) in the target DBMS 230, the accelerator server 221 sends the details of the tables, which are being targeted by the query, to the replication engine to calculate the staleness of the data being queried. The table information includes a table identifier and modification timestamp $TS_{target1}$.

Based on receiving the table information, the replication engine 222 sends staleness information based on a timestamp of data it has replicated (225). Thus, replication engine 222 compares the modification timestamp $TS_{target1}$ against the internal replication timestamp of the replication engine 222 ($TS_{replication}$) to find the staleness and report back to the accelerator server 221. The staleness information can be represented by ($TS_{target1}$-$TS_{replication}$) where ($TS_{replication}$) is the timestamp of the replicated data. This staleness information comprises the indicator referenced in FIG. 1.

Upon receiving a response from the replication engine 222, the accelerator server 221 immediately executes the query in target DBMS 230 (235). Responsive to issuing the query, the accelerator server 221 receives data from the target DBMS 230 (245). The accelerator transmits the data from the target DBMS 230 to the source DBMS 211 with the staleness information (255). The monitoring system obtains the staleness information and displays it (265). Thus, As soon as source DBMS 211 receives the response from the accelerator server 221, this staleness information becomes available for the monitoring system to consume.

As aforementioned, in FIG. 3, the technical environment 300 includes multiple source DBMSs, e.g., DBMS1 311a and DBMS2 311b, issuing queries to a target DBMS 330. Although only two DBMSs are included as source DBMSs in this example, aspects described herein can be applied in environments with multiple DBMSs. This example with two DBMSs was selected for clarity of illustration only and does not suggest any limitations.

The technical environment 300 illustrated includes multiple source DBMS systems 310, source DBMS1 311a, and source DBMS2 311b. Source DBMS1 311a is communicatively connected to a monitoring system 312, which monitors the source DBMS 311a. Each of the source DBMSs, DBMS1 311a and DBMS 311b, are communicatively coupled to a capture engine 213a, 213b. The monitoring system 312 performs tasks associated with examining the operational status of the database, by collecting information from DBMS 311a, its databases, and any connected applications. For example, the monitoring system 312 can forecast hardware requirements based on database usage patterns, analyze the performance of individual applications or SQL queries, track the usage of indexes and tables, pinpoint the cause of poor system performance, and/or assess the impact of optimization activities. The capture engines 313a, 313b for each source DBMS are part of replication between the different DBMSs 311a, 311b, 330 in the technical environment 300. A capture engine captures changes to databases as they happen and delivers them to target databases. In this case, the capture engine 313a, 313b for each source in the multiple source DBMS system 210 captures and delivers changes to the one or more databases of its respective DBMS.

Source DBMS1 311a and source DBMS2 311b and a target DBMS 330 are communicatively coupled to on an accelerator server 321, in the example illustrated in FIG. 3. The accelerator asynchronously replicates to the accelerator (OLAP system) from OLTP system. The replication engine 322a for the source DBMS1 311a is communicatively coupled to the capture engine 313a for source DBMS1 311a and to the target DBMS 330 and receives accelerated queries from the accelerator server 321. The replication engine 322b for the source DBMS2 311b is communicatively coupled to the capture engine 313b for source DBMS1 311b and to the target DBMS 330 and receives accelerated queries from the accelerator server 321.

Data replication occurs in this technical environment 300 when a change to a database managed by a source DBMS 311a, 311b is communicated to a capture engine 313a, 313b (342), which communicates the change to a replication engine 322a, 322b (344), which replicates the change in a database managed by the target DBMS 330 (346). Thus, as illustrated in FIG. 3, the data replication process is orchestrated by the (data) capture engines 313a, 313b and the replication engines 322a, 322b.

As illustrated in FIG. 3, a source DBMS 311a in the source DBMS system 310 receives a query (to execute in the target DBMS 330) from an application and passes control of the query, including the query request and a timestamp indicating a latest modification for tables in the query to an accelerator (305). In this example, source DBMS1 311a initiates the query. Also in this example, the query (Q1) is a select statement, for example, "select * from T1, T2" where T1 is a table on the source DBMS1 311a and T2 is a table on the source DBMS2 311b that both have been loaded into the same accelerator or column store structure executing on the accelerator server 321 to enable acceleration for queries against table T1 and T2. Thus, the multiple source DBMS 310 passes control of the query to the accelerator including: 1) the query request; and 2) the latest modification timestamp for tables in the query. An example of the information passed is "select DBMS1.T1, DBMS2.T2 (Time Stamp 1 ($TS_{target1}$) for DBMS1.T1)." TS1 is log position or timestamp in DBMS1 at time when Q1 comes in.

Returning to FIG. 3, the accelerator sends the table information from the query for each source DBMS 311a, 311b to a respective replication engine 322a, 322b (315). Because the query was initiated by source DBMS 311a, the accelerator does not have the timestamps for T2. Thus, the accelerator gets the object level TStarget2 for T2 (325). The object is returned, the timestamp, TStarget2 for T2 (335).

In this example, accelerator server 321 sends T1 info (Table ID), $TS_{target1}$ to the replication engine 322a for source DBMS1 311a and sends T2 information (Table ID) to the replication engine 322b for source DBMS2 311b. In some examples, the accelerator sends the table information to the various replication engines simultaneously. Thus, before the accelerator executes the query (Q1) in the target DBMS 330, the accelerator server 321 sends details of the table T1, including Table ID and modification timestamp $TS_{target1}$, to the replication engine for the source DBMS1 311a. The replication engine 322a for DBMS1 311a will then compare the modification timestamp $TS_{target1}$ against its internal replication timestamp ($TS_{replication1}$) to find the staleness and report back to the accelerator server 321. At the same time or synchronously (although all results are returned to the accelerator server 321 before the query is executed), the accelerator server 321 transmits the Table ID for tables, such as T2 from source DBMS2 311b, to its respective replication engine 322b. Once this replication engine 322b receives the request, a request is made to the source DBMS2 311b to retrieve the last modification timestamp TStarget2. The replication engine 322b for DBMS2 311b compares the modification timestamp TStarget2 against its internal replication timestamp ($TS_{replication2}$) to find the staleness and report back to the accelerator server 321. Upon receiving all responses from the replication engines, the accelerator server executes the query. In some examples, the execution is immediate.

As noted above, based on receiving the table information, the replication engines 322a, 322b send staleness information based on timestamps of data they have replicated (345). This staleness information comprises the indicator referenced in FIG. 1.

Upon receiving responses from the replication engines 322a, 322b, the accelerator server 321 immediately executes the query in target DBMS 330 (355). Responsive to issuing the query, the accelerator server 321 receives data from the target DBMS 330 (365). The accelerator transmits the data from the target DBMS 330 to the source DBMS1 311a that initiated the query, with the staleness information (375). The monitoring system obtains the staleness information and displays it (385). Thus, as soon as source DBMS1 311a that initiated the query receives the response from the accelerator server 321, this staleness information becomes available for the monitoring system to consume.

Examples of the present invention include a computer-implemented method, a computer program product, and a computing system where program code executed by one or more processors obtains a query request from an application via a source database management system to a target database management system, where the query request comprises a query and a query timestamp indicating a last update to one or more tables in the source database management system referenced in the query request. The program code determines a table update timestamp indicating a last time when the one or more tables in the source database management system referenced in the query request was replicated to the target database management system. The program code generates an indicator where the indicator represents a difference between the query timestamp and the table update timestamp. The program code executes the query in the target database management system. Based on executing the query, the program code obtains a query result. The program code transmits the query result and the indicator to the source database management system.

In some examples, the source database management system is an online transactional processing system.

In some examples, the target database management system is an online analytical processing system.

In some examples, the program code determining the table update timestamp comprises, includes the program code querying a replication engine communicatively coupled to a capture engine of the source database management system and the target database management system to obtain the table update timestamp.

In some examples, the program code executes the query comprises executing the query by an accelerator.

In some examples, the one or more tables in the source database management system referenced in the query request were loaded into the accelerator column store structure.

In some examples, the query comprises a reference to one or more tables in another source database management system. The program code queries the other source database management system to obtain another query timestamp indicating a last update to the one or more tables in the other source database management system. The program code determines a table update timestamp indicating a last time when the one or more tables in the other source database management system were replicated to the target database management system. The program code generates another indicator where the other indicator represents a difference between the other query timestamp and the table update timestamp indicating the last time when the one or more tables in the other source database management system was replicated to the target database management system. The program code transmits the other indicator with the query result and the indicator to the source database management system.

In some examples, the program code displays the indicator in an interface communicatively coupled to the source database management system.

In some examples, the program code determines that data queried when executing the query is current based on the difference indicating that the query timestamp is and same or older than the table update timestamp.

In some examples, the program code determines that data queried when executing the query is stale based on the difference indicating that the query timestamp is and newer than the table update timestamp.

Referring now to FIG. 4, a schematic of an example of a computing node, which can be a cloud computing node 10. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove. In an embodiment of the present invention, various computing nodes in the technical environments 200, 300 in FIGS. 2 and 3 can each comprise a cloud computing node 10 (FIG. 4) and if not a cloud computing node 10, then one or more general computing nodes that include aspects of the cloud computing node 10. The nodes include, but are not limited to, the monitoring systems, DBMSs, capture engines, and accelerator servers.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 4, computer system/server 12 that can be utilized as cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs). Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter). Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user specific application configuration settings.

Platform as a Service (PaaS): the capability provided to the consumer is to deploy onto the cloud infrastructure consumer-created or acquired aF1pplications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 5:
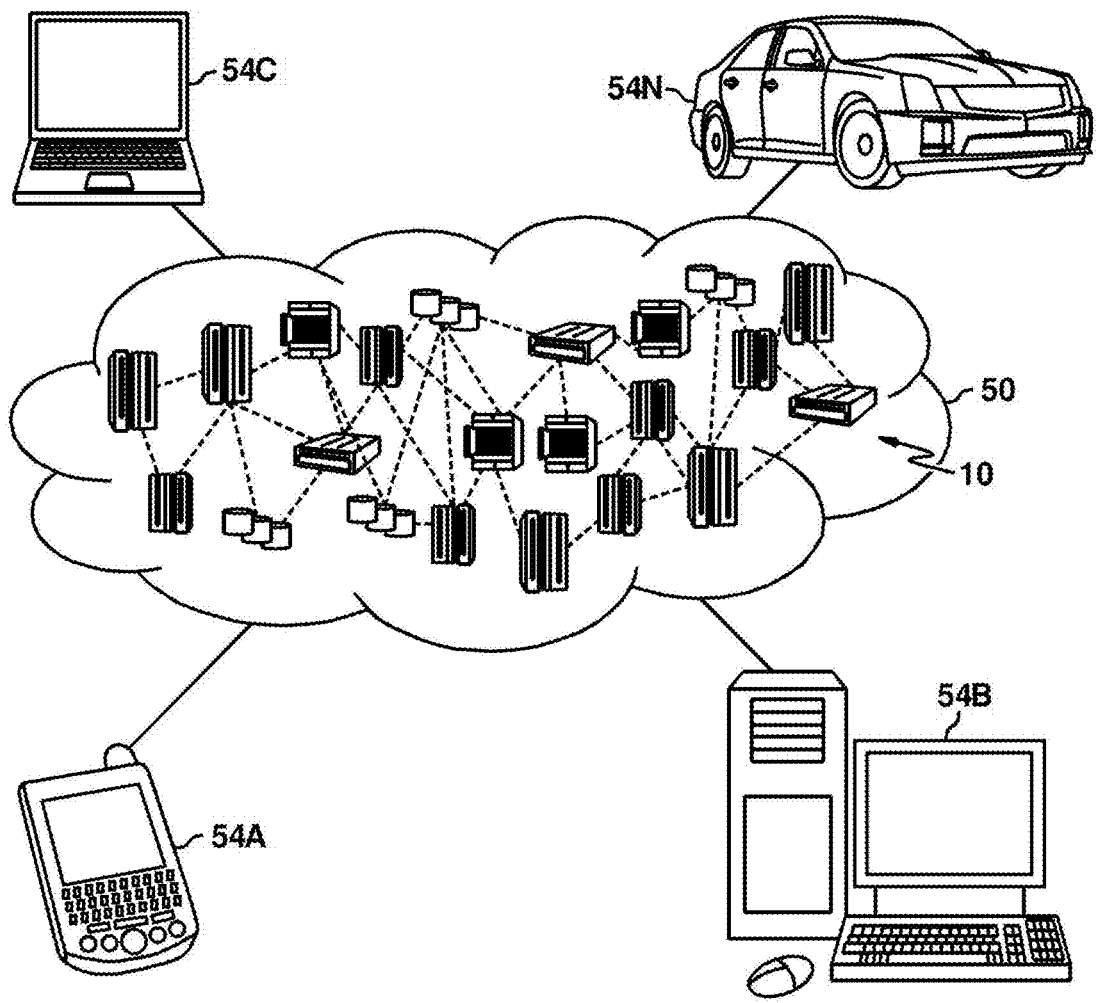
FIG. 5 depicts a cloud computing environment according to an embodiment of the present invention.

Referring now to FIG. 5, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
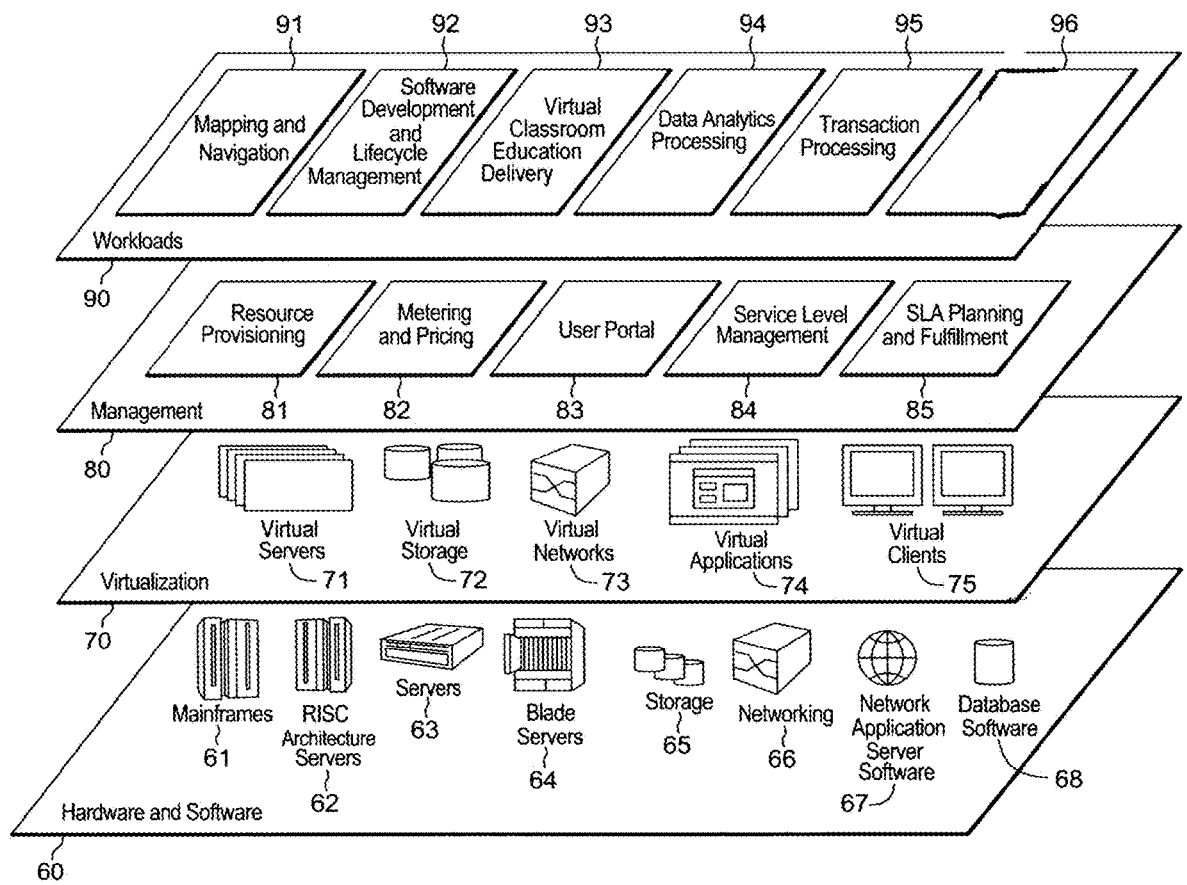
FIG. 6 depicts abstraction model layers according to an embodiment of the present invention.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and report of data staleness in queries requested by applications 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method, comprising:
executing, by one or more processors, a query from an application on target tables of a target database management system accessed by the query to obtain, at the application, data responsive to the query, wherein the application has a stale data tolerance, the executing comprising:
obtaining, by the one or more processors, a query request from the application via a source database management system to the target database management system, wherein the query request comprises the query and a query timestamp indicating a last update to one or more tables in the source database management system referenced in the query request, and wherein the source database management system and the target database management system comprise an asynchronous replication enabled hybrid database management systems;
obtaining, by the one or more processors, a table update timestamp indicating a last time when the one or more tables in the source database management system referenced in the query request was replicated to the target database management system, based on determining the last time when the one or more tables in the source database management system referenced in the query request were replicated to the target database management system;
generating, by the one or more processors, an indicator wherein the indicator represents a difference between the query timestamp and the table update timestamp, wherein the indicator reports a staleness of the data specifically in target tables of the target database management system accessed by the query comprising the data responsive to the query, wherein the indicator is a measurable value which indicates a measurable staleness of the data responsive to the query;
executing, by the one or more processors, the query in the target database management system;
based on executing the query, obtaining, by the one or more processors, a query result comprising the data responsive to the query; and
transmitting, by the one or more processors, to the application, a query response, wherein the query response comprises the query result and the indicator, to the source database management system, wherein the indicator reports to the application whether the query is returning stale or current data from the target tables of the target database management system accessed by the query comprising the data responsive to the query, and wherein the application determines, based on whether the measurable value of indicator comports with the stale data tolerance of the application, whether the application will utilize the data responsive to the query.

2. The computer-implemented method of claim 1, wherein the source database management system is an online transactional processing system.

3. The computer-implemented method of claim 1, wherein the target database management system is an online analytical processing system.

4. The computer-implemented method of claim 1, wherein determining the last time when the one or more tables in the source database management system referenced in the query request were replicated to the target database management system to obtain the table update timestamp comprises:
querying, by the one or more processors, a replication engine communicatively coupled to a capture engine of the source database management system and the target database management system to obtain the table update timestamp.

5. The computer-implemented method of claim 1, wherein executing the query comprises executing the query by an accelerator.

6. The computer-implemented method of claim 5, wherein the one or more tables in the source database management system referenced in the query request were loaded into a column store structure of the accelerator.

7. The computer-implemented method of claim 1, wherein the query comprises a reference to one or more tables in a second source database management system, the method further comprising:
querying, by the one or more processors, the second source database management system to obtain a second query timestamp indicating a latest update to the one or more tables in the second source database management system;
determining, by the one or more processors, a table update timestamp indicating a latest time when the one or more tables in the second source database management system were replicated to the target database management system;
generating, by the one or more processors, a second indicator wherein the second indicator represents a difference between the second query timestamp and the table update timestamp indicating the latest time when the one or more tables in the second source database management system was replicated to the target database management system; and
transmitting, by the one or more processors, the second indicator in the query response to the source database management system.

8. The computer-implemented method of claim 1, further comprising:
displaying, by the one or more processors, the indicator in an interface communicatively coupled to the source database management system.

9. The computer-implemented method of claim 1, further comprising:
determining, by the one or more processors, that data queried when executing the query is current based on the difference indicating that the query timestamp is equivalent or older than the table update timestamp.

10. The computer-implemented method of claim 1, further comprising:
determining, by the one or more processors, that data queried when executing the query is stale based on the difference indicating that the query timestamp is and newer than the table update timestamp.

11. A computer program product comprising:
a computer readable storage medium readable by one or more processors of a shared computing environment comprising a computing system and storing instructions for execution by the one or more processors for performing a method comprising:
executing, by the one or more processors, a query from an application on target tables of a target database management system accessed by the query to obtain, at the application, data responsive to the query, wherein the application has a stale data tolerance, the executing comprising:

obtaining, by the one or more processors, a query request from the application via a source database management system to the target database management system, wherein the query request comprises the query and a query timestamp indicating a last update to one or more tables in the source database management system referenced in the query request, and wherein the source database management system and the target database management system comprise an asynchronous replication enabled hybrid database management systems;

obtaining, by the one or more processors, a table update timestamp indicating a last time when the one or more tables in the source database management system referenced in the query request was replicated to the target database management system, based on determining the last time when the one or more tables in the source database management system referenced in the query request were replicated to the target database management system;

generating, by the one or more processors, an indicator wherein the indicator represents a difference between the query timestamp and the table update timestamp, wherein the indicator reports a staleness of the data specifically in target tables of the target database management system accessed by the query comprising the data responsive to the query, wherein the indicator is a measurable value which indicates a measurable staleness of the data responsive to the query;

executing, by the one or more processors, the query in the target database management system;

based on executing the query, obtaining, by the one or more processors, a query result comprising the data responsive to the query; and transmitting, by the one or more processors, to the application, a query response, wherein the query response comprises the query result and the indicator, to the source database management system, wherein the indicator reports to the application whether the query is returning stale or current data from the target tables of the target database management system accessed by the query comprising the data responsive to the query, and wherein the application determines, based on whether the measurable value of indicator comports with the stale data tolerance of the application, whether the application will utilize the data responsive to the query.

12. The computer program product of claim 11, wherein the source database management system is an online transactional processing system.

13. The computer program product of claim 11, wherein the target database management system is an online analytical processing system.

14. The computer program product of claim 11, wherein determining the last time when the one or more tables in the source database management system referenced in the query request were replicated to the target database management system to obtain the table update timestamp comprises:

querying, by the one or more processors, a replication engine communicatively coupled to a capture engine of the source database management system and the target database management system to obtain the update table timestamp.

15. The computer program product of claim 11, wherein executing the query comprises executing the query by an accelerator.

16. The computer program product of claim 15, wherein the one or more tables in the source database management system referenced in the query request were loaded into the accelerator column store structure.

17. The computer program product of claim 11, wherein the query comprises a reference to one or more tables in another source database management system, the method further comprising:

querying, by the one or more processors, the other source database management system to obtain another query timestamp indicating a last update to the one or more tables in the other source database management system;

determining, by the one or more processors, a table update timestamp indicating a last time when the one or more tables in the other source database management system was replicated to the target database management system;

generating, by the one or more processors, another indicator wherein the other indicator represents a difference between the other query timestamp and the table update timestamp indicating the last time when the one or more tables in the other source database management system was replicated to the target database management system; and transmitting, by the one or more processors, the other indicator in the query response to the source database management system.

18. The computer program product of claim 11, further comprising:

displaying, by the one or more processors, the indicator in an interface communicatively coupled to the source database management system.

19. The computer program product of claim 11, further comprising:

determining, by the one or more processors, that data queried when executing the query is current based on the difference indicating that the query timestamp is equivalent or older than the table update timestamp.

20. A computer system comprising:

a memory;

one or more processors in communication with the memory;

program instructions executable by the one or more processors in a shared computing environment of a computing system via the memory to perform a method, the method comprising:

executing, by the one or more processors, a query from an application on target tables of a target database management system accessed by the query to obtain, at the application, data responsive to the query, wherein the application has a stale data tolerance, the executing comprising:

obtaining, by the one or more processors, a query request from the application via a source database management system to the target database management system, wherein the query request comprises the query and a query timestamp indicating a last update to one or more tables in the source database management system referenced in the query request, and wherein the source database management system and the target database management system comprise an asynchronous replication enabled hybrid database management systems;

obtaining, by the one or more processors, a table update timestamp indicating a last time when the one or more tables in the source database management system referenced in the query request was replicated to the target database management system, based on determining the last time when the one or more tables in the source database management system referenced in the query request were replicated to the target database management system;

generating, by the one or more processors, an indicator wherein the indicator represents a difference between the query timestamp and the table update timestamp, wherein the indicator reports a staleness of the data specifically in target tables of the target database management system accessed by the query comprising the data responsive to the query, wherein the indicator is a measurable value which indicates a measurable staleness of the data responsive to the query;

executing, by the one or more processors, the query in the target database management system;

based on executing the query, obtaining, by the one or more processors, a query result comprising the data responsive to the query; and transmitting, by the one or more processors, to the application, a query response, wherein the query response comprises the query result and the indicator, to the source database management system, wherein the indicator reports to the application whether the query is returning stale or current data from the target tables of the target database management system accessed by the query comprising the data responsive to the query, and wherein the application determines, based on whether the measurable value of indicator comports with the stale data tolerance of the application, whether the application will utilize the data responsive to the query.

* * * * *